United States Patent [19]
Van Der Zaag et al.

[11] Patent Number: 6,002,211
[45] Date of Patent: Dec. 14, 1999

[54] SINTERED MOULDING, TRANSFORMER CORE AND INDUCTOR CORE OF LI(NI)ZN FERRITE MATERIAL, AS WELL AS APPLICATIONS THEREOF

[75] Inventors: Pieter J. Van Der Zaag, Eindhoven, Netherlands; Pieter J. Van Der Valk, Guadalajara, Spain

[73] Assignee: U.S. Philips Corporation, New York, N.Y.

[21] Appl. No.: 08/528,385

[22] Filed: Sep. 13, 1995

[30] Foreign Application Priority Data

Sep. 14, 1994 [EP]  European Pat. Off. .............. 94202644

[51] Int. Cl.⁶ ..................................................... H05B 37/02
[52] U.S. Cl. ........................... 315/248; 315/276; 148/306
[58] Field of Search ............................. 148/306; 315/248, 315/276

[56] References Cited

U.S. PATENT DOCUMENTS

| 4,238,342 | 12/1980 | Im et al. ................................ 252/62.61 |
| 4,728,867 | 3/1988 | Postman et al. .......................... 315/248 |
| 4,748,383 | 5/1988 | Houkes ..................................... 315/248 |
| 5,206,620 | 4/1993 | Watanabe .............................. 336/84 M |
| 5,449,419 | 9/1995 | Suzuki et al. ............................ 148/306 |

OTHER PUBLICATIONS

Philips Data Handbook, MA–01, 1993, p. 134.

*Primary Examiner*—Michael B Shingleton

[57] ABSTRACT

The invention relates to a sintered moulding of Li(Ni)Zn ferrite material, a transformer core and an inductor core of this material as well as several applications of these cores. In accordance with the invention, the majority of the grains of the sintered material have a monodomain structure. This leads to a substantial reduction of the loss factor and the overall losses when these mouldings are subjected to high-frequency applications and power applications. The ferrite material preferably comprises 59–65 mol % $Fe_2O_3$, 7–11 mol % $Li_2CO_3$, 4–8 mol % MnO and 20–28 mol % ZnO. This also provides the material with a high saturation magnetization.

6 Claims, 2 Drawing Sheets

SINTERED MOULDING, TRANSFORMER CORE AND INDUCTOR CORE OF LI(NI)ZN FERRITE MATERIAL, AS WELL AS APPLICATIONS THEREOF

The invention relates to a sintered moulding made from Li(Ni)Zn ferrite material. Li(Ni)Zn ferrite material is to be understood to mean herein pure LiZn ferrite material having a spinel structure as well as related ferrite material, in which Li is partly replaced by Ni. The invention also relates to a transformer core and an inductor core which are made from this material. The invention additionally relates to a transformer comprising a transformer core of the above-mentioned type as well as to an induction lamp comprising an inductor of the above-mentioned type.

BACKGROUND OF THE INVENTION

Mouldings of the type mentioned in the opening paragraph are known per se. For example, in Philips Data Handbook MA-01, 1993, page 134 a description is given of a sintered moulding in the form of a transformer core which is commercially available under the trade name 6B1. The material composition of this sintered moulding corresponds to the formula $Li_{0.32}Zn_{0.43}Mn_{0.11}Fe_{2.16}O_{3.985}$.

This known moulding has the disadvantage that when it is used as a transformer core in a transformer which is operated at high frequencies, it exhibits a relatively high loss factor (V) and high overall losses (P). It has been found that the losses at room temperature are approximately $17.0$ mW/cm$^3$. This value is measured at a frequency of 3 MHz and an induction of 1 mT. These losses increase considerably when a higher induction is used or when the frequency is further increased. For example, the overall losses amount to 180 mW/cm$^3$ at a frequency of 3 MHz and an induction of 5 mT. When said known moulding is used as a transformer core in a transformer, the high overall losses may lead to undesirable heating of the transformer. Consequently, transformer cores made from this type of material are unsuitable, in particular, for use in so-called "power" transformers. These transformers are operated at relatively high frequencies of 1 MHz or more and at relatively high inductions of 5 mT or more. In general, the expression "power applications" is to be understood to mean applications of this type of ferrite materials at frequencies in excess of 1 MHz in combination with inductions in excess of 1 mT.

SUMMARY OF THE INVENTION

It is an object of the invention to obviate the above disadvantages. The invention more particularly aims at providing a sintered moulding of Li(Ni)Zn ferrite material which exhibits relatively low losses at high-frequency applications, more particularly at power applications. The invention additionally provides a number of favourable applications of the inventive material in which the property of low overall losses of the inventive material is used.

These and other objects of the invention are achieved by a sintered moulding of Li(Ni)Zn ferrite material which is characterized in accordance with the invention in that the majority of the grains of the sintered material have a monodomain structure.

Applicants have experimentally established that sintered mouldings of Li(Ni)Zn ferrite materials exhibit a surprisingly low loss factor and surprisingly low overall losses if the majority of the grains of the sintered material are monodomain. This phenomenon already occurs when the mouldings are used at frequencies of 1 MHz and higher. This reduction of the losses occurs in particular when the mouldings are used at a high frequency in combination with a high induction, such as in the case of "power" applications. Under certain conditions the losses can be halved or more than halved. The sintered mouldings in accordance with the invention can thus advantageously be used in the form of a transformer core or an inductor core, for example in a transponder or a lamp (ballast coil). It is noted that the expression "the majority of the grains" is to be understood to mean herein "at least 90% of the grains". It is further noted that grains having a monodomain structure comprise only one magnetic domain.

A preferred embodiment of the sintered moulding in accordance with the invention is characterized in that the average grain size of the material is 4.2 microns or less. Applicants have established in a series of experiments that in the case of an average grain size of approximately 4.2 micrometers, the quantity of grains having a monodomain structure in the sintered material is approximately 90%. A smaller average grain size leads to a higher percentage of grains having a monodomain structure. Percentages of 98% or more are obtained if the average grain size of the Li(Ni)Zn ferrite material lies in the range of 1.6–2.6 micrometers. Sintered mouldings having an average grain size in this range exhibit the lowest overall losses. It is noted that the average grain size of the known 6B1 material is approximately 7 microns. The majority of the grains of this sintered material do not have a monodomain structure.

As mentioned hereinabove, the ferrite material in accordance with the invention comprises, in addition to Fe, at least Li and Zn as metal ions. Dependent upon the desired application, a part of the Li ions can be replaced by Ni ions. It has been found that up to 50 at. % of Li can be substituted with Ni. In this case, one $Li^+$-ion and one $Fe^{3+}$-ion are replaced by two $Ni^{2+}$-ions. It has been found that such mixed ferrite materials also exhibit reduced overall losses if the average grain size is so small that the majority of the grains are monodomain. For reasons relating to costs, however, it is favourable to replace less than 25 at. % of Li by the relatively expensive Ni. Preferably, even less than 10 at. % of Li is replaced by Ni. The cheapest sintered mouldings in accordance with the invention do not comprise any Ni at all.

The ferrite material in accordance with the invention preferably also comprises a small quantity of Co. This additive leads to a relatively flat $\mu$-T curve, in particular in the temperature range in which power transformers are customarily used. However, a quantity of Co in excess of 1.5 at. % is disadvantageous. Such larger quantities do not lead to a flatter curve. In addition, Co is expensive and toxic. The ferrite material in accordance with the invention may also comprise small quantities of dopants, such as the sintering agents $V_2O_5$ and/or $Bi_2O_3$. The ferrite material may also comprise relatively small quantities of MnO, $SiO_2$ and/or CaO. The typical quantity of these dopants is generally less than 4 wt. %.

Another preferred embodiment of the moulding in accordance with the invention is characterized in that the ferrite material of the core comprises 59–65 mol % $Fe_2O_3$, 7–11 mol % $Li_2CO_3$, 4–8 mol % MnO and 20–28 mol % ZnO. Sintered mouldings of this composition exhibit a relatively high spontaneous magnetic induction B. By virtue of this property, it is extra interesting to use mouldings of this composition as transformer cores or inductor cores.

The invention also relates to a transformer comprising a primary and a secondary winding as well as a high-frequency switch for converting a DC voltage on the primary winding to an AC voltage. In accordance with the invention, this transformer comprises a transformer core of Li(Ni)Zn ferrite material, as described hereinabove. This type of transformer is commonly referred to as "switched mode power supply" and can be operated at high frequencies and high inductions. As the transformer cores in accordance with the invention exhibit low overall losses under these conditions, undesirable heating of the transformer is avoided to an important degree.

The invention also relates to an induction lamp comprising a power-supply device, a discharge vessel, which encloses a discharge space filled with an ionizable gas, as well as a sintered inductor core having a winding which is connected to the power-supply device. The induction lamp is provided, in accordance with the invention, with an inductor core as described hereinabove. During operation of such a lamp, a high-frequency electromagnetic field is generated in the discharge space by means of the winding. This leads to losses in the inductor core. By using an inductor core in accordance with the invention, the losses remain relatively small. This measure leads to a longer life of the induction lamp.

These and other aspects of the invention win be apparent from and elucidated with reference to the embodiments described hereinafter.

BRIEF DESCRIPTION OF THE DRAWING FIGURES

DESCRIPTION OF THE INVENTION

Figure 1:
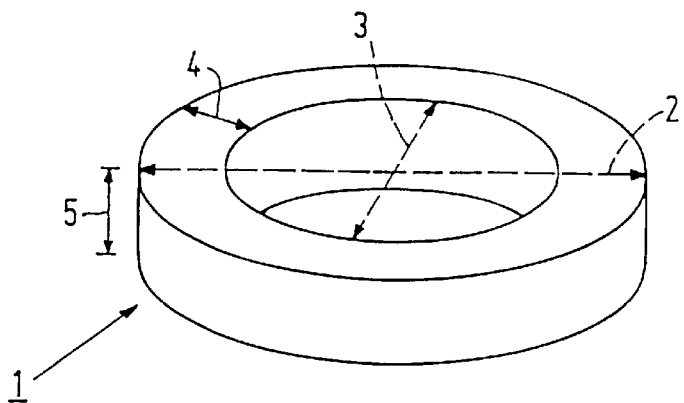
FIG. 1 is a perspective view of a transformer core in accordance with the invention.

FIG. 1 shows a ring-shaped transformer core 1. In this case, the transformer core has an outer diameter 2 of 5 mm and an inner diameter of 3 mm. The width 4 and the height 5 of the ring are both 1 mm. It is noted that the core may also have a completely different shape, for example an oval shape. The cross-section of the ring may alternatively be rectangular or round instead of square, as shown in FIG. 1. The transformer core is composed of a sintered moulding of LiZn ferrite material of the nominal composition $Li_{0.32}Zn_{0.42}Mn_{0.11}Fe_{2.16}O_{3.985}$.

Figure 2:
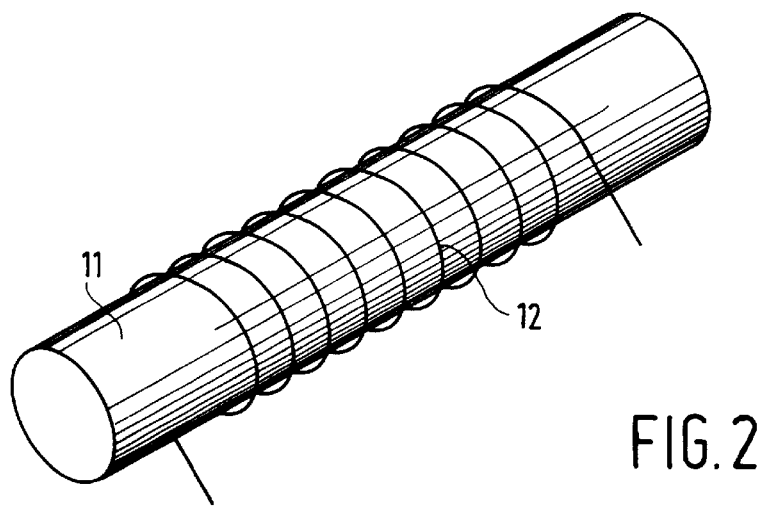
FIG. 2 is a perspective view of an inductor core in accordance with the invention.

FIG. 2 shows a rod-shaped inductor 11 which is made from sintered Li(Ni)Zn ferrite material. This inductor may be oval or square in section. Although the drawing shows a solid inductor core, it is alternatively possible to construct the inductor as a hollow tube. The inductor comprises a winding 12 which can be connected to a power-supply device. The material of the inductor also has the nominal composition $Li_{0.32}Zn_{0.42}Mn_{0.11}Fe_{2.16}O_{3.985}$.

The above-mentioned transformer and inductor cores were manufactured as follows. For the starting material use was made of a mixture of 76.6 wt. % $Fe_2O_3$, 5.42 wt. % $Li_2CO_3$, 3.43 wt. % MnO, 15.2 wt. % ZnO and 0.44 wt. % $Bi_2O_3$. $Bi_2O_3$ was added as a sintering agent. The mixture was ground, pre-fired and subsequently subjected to a wet grinding operation. The mixture thus obtained was dry sprayed or dried and granulated, whereafter it was compacted into the intended shape and sintered in air. A number of transformer and inductor cores having the above-mentioned nominal composition and exhibiting different average grain sizes can be obtained in this manner by varying the duration and the temperature (900–1150° C.) of the sintering process. In the present case the sinter duration was kept constant (1.5 hour) whereas the sinter temperature was varied. The sinter temperature used and the corresponding average grain size d (micrometer) are indicated in Table 1. The average grain size was measured by means of the so-called "linear mean intercept" method.

The loss factor V and the overall losses P ($mW/cm^3$) of a number of the above-mentioned transformer cores were measured as a function of the average grain size d. These measurements were carried out at a frequency and induction of, respectively, 3 MHz and 0.1 mT (V1), 5 MHz and 0.1 mT (V2), 3 MHz and 1 mT (P1), 3 MHz and 5 mT (P2) and 5 MHz and 1 mT (P3). The measured values are listed in Table 1.

TABLE 1

| d | T(°C.) | $V_1(10^{-6})$ | $V_2(10^{-6})$ | $P_1$ | $P_2$ | $P_3$ |
|---|---|---|---|---|---|---|
| 1.59 | 900 | 67 | 117 | 2.1 | 106 | 3.6 |
| 1.70 | 912 | 67 | 113 | 1.4 | 104 | 2.7 |
| 1.92 | 925 | 68 | 113 | 1.4 | 102 | 2.8 |
| 2.36 | 950 | 73 | 130 | 1.4 | 100 | 3.0 |
| 2.61 | 975 | 78 | 164 | 1.2 | 98 | 3.1 |
| 4.21 | 1000 | 81 | 214 | 1.4 | 97 | 4.3 |
| 4.92 | 1025 | 93 | 313 | 1.7 | 117 | 5.7 |
| 5.60 | 1050 | 99 | 357 | 1.9 | 120 | 7.3 |
| 6.30 | 1100 | 128 | 541 | 3.3 | 162 | 12.7 |
| 7.23 | 1150 | 163 | 731 | 4.7 | 180 | 17.0 |

The Table shows that the loss factor (tan $\delta/\mu$) and the overall losses are relatively small if the average grain size of the core is 4.2 micrometers or less. Neutron depolarization measurements have shown that, under these conditions, the majority of the grains have a monodomain structure.

In further experiments a number of so-called mixed Li/Ni-ferrite cores was manufactured using two different compositions. The loss factor V was measured as a function of the average grain size d (microns). The measurements were carried out at a frequency of 5 MHz and an induction of 0.1 mT. The results of these measurements are depicted in Table 2 for the composition $Ni_{0.32}Li_{0.16}Zn_{0.42}Mn_{0.11}Fe_{2.00}O_{3.985}$ and in Table 3 for the composition $Ni_{0.16}Li_{0.24}Zn_{0.42}Mn_{0.10}Fe_{2.08}O_{3.985}$. These tables show again that the loss factor of these cores is relatively small if the average grain size of the cores is less than about 4.2 microns.

TABLE 2

| d | $V(10^{-6})$ |
|---|---|
| 1.05 | 110 |
| 1.87 | 88 |
| 2.04 | 96 |
| 2.31 | 87 |
| 2.55 | 91 |
| 2.67 | 95 |
| 2.83 | 105 |
| 3.15 | 302 |
| 3.43 | 463 |
| 4.20 | 480 |
| 5.21 | 507 |

TABLE 3

| d | V(10⁻⁶) |
|---|---|
| 1.46 | 122 |
| 1.97 | 120 |
| 2.45 | 115 |
| 2.65 | 110 |
| 2.87 | 132 |
| 3.21 | 320 |
| 3.93 | 480 |
| 4.28 | 528 |
| 6.34 | 535 |

Figure 3:
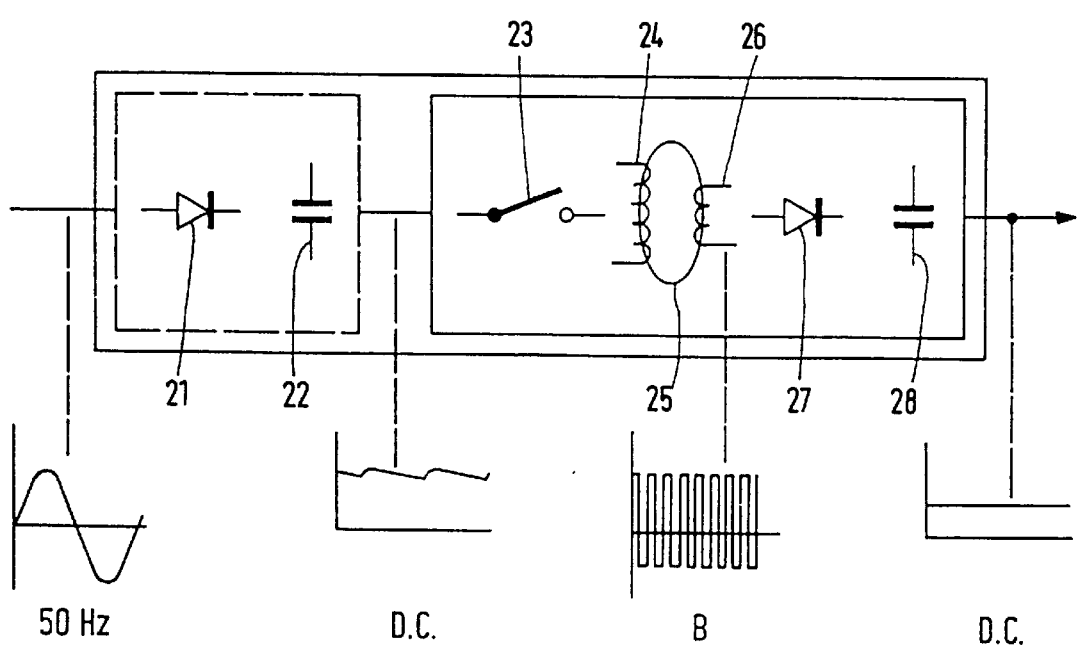
FIG. 3 is a schematic diagram of a switched mode power supply (SMPS) in accordance with the invention.

FIG. 3 shows a schematic diagram of a transformer of the "switched mode power supply" type, in which the transformer core in accordance with the invention can be advantageously used. The input mains voltage (50 Hz) is first rectified with a rectifier (21) and smoothed with a capacitor (22). The DC voltage thus formed is converted by means of a rectifier (23), represented herein as a switching transistor, at very high frequencies (2 to 20 MHz) into a square wave B. This square wave is applied to the primary winding (24) of the transformer core (25). The transformer core is made from a sintered Li(Ni)Zn ferrite material the majority of the grains of which have a monodomain structure. The transformed square wave signal formed on the secondary winding (26) of the transformer core (25) is subsequently rectified with a rectifier (27) and smoothed with a capacitor (28). As a result, a DC voltage of the desired value is obtained.

The transformer cores in accordance with the invention can of course also be used in other types of transformers, such as transformers of the resonant type. In such transformers, the AC voltage B does not so much have a square wave characteristic as a sinusoidal wave characteristic. However, the effect of the invention is obtained, in particular, if these transformers are operated at high frequencies and high inductions, i.e. particularly in "power" applications.

Figure 4:
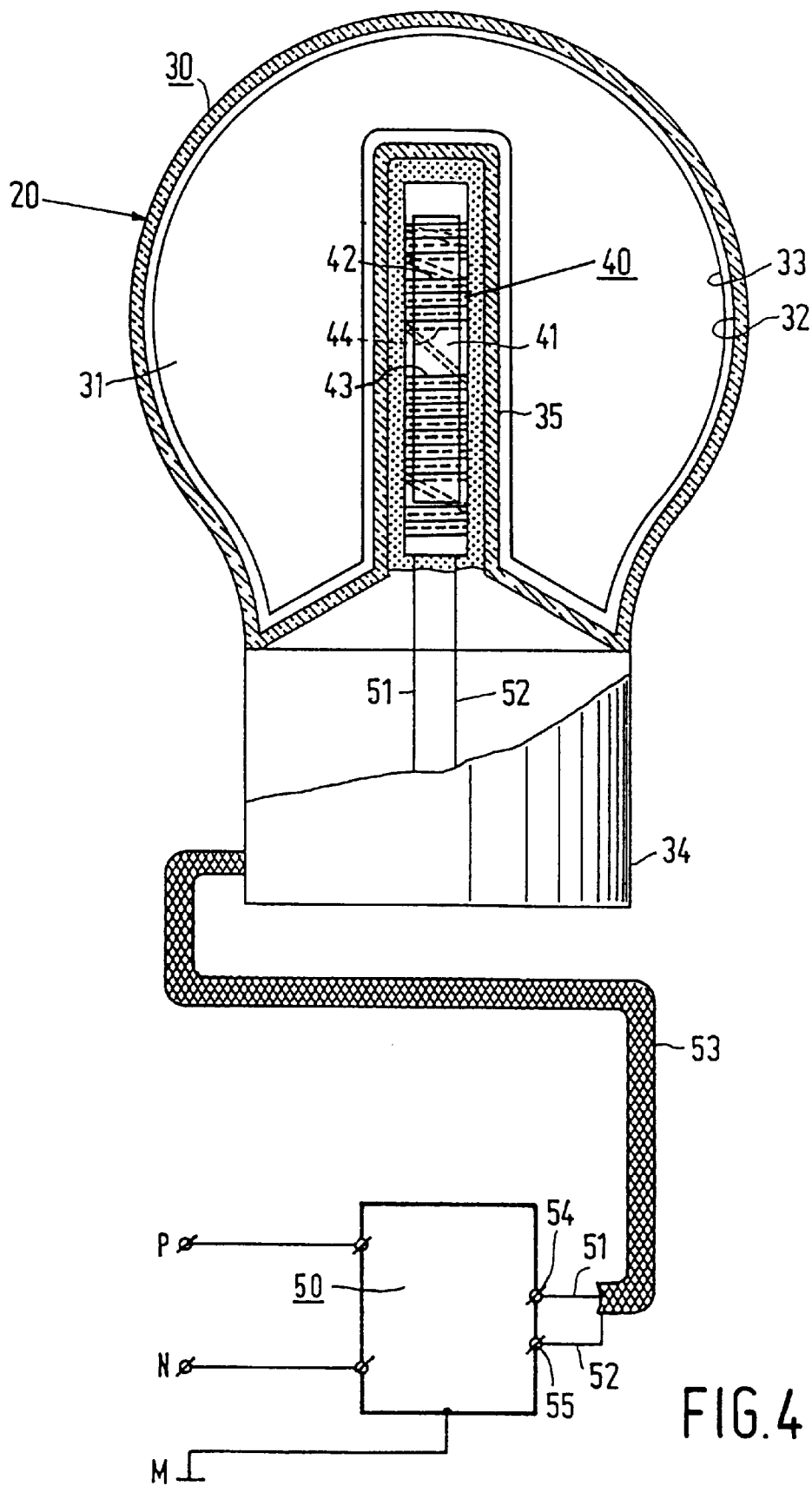
FIG. 4 is a sectional view of an induction lamp in accordance with the invention.

FIG. 4 shows an induction lamp comprising an electrodeless low-pressure discharge lamp 20 and a power-supply device 50. Lamp 20 comprises a discharge vessel 30 which encloses a discharge space 31 containing an ionizable filler in a gastight manner. In this case, the discharge space 31 comprises mercury and argon. An internal surface 32 of the discharge vessel 30 is provided with a layer 33 of a luminescent material. In another embodiment, such a layer is absent and the filler comprises sodium. The discharge vessel 30 is secured to a synthetic resin support 34. The lamp 20 further comprises a coil 40 which is formed by a sintered core 41 of a polycrystalline ferrite material having a winding 42. The core is made from an Li(Ni)Zn ferrite material the majority of the grains of which are monodomain. In the present case, the average grain size was 2.61 micrometers. The core may be, for example, ring-shaped.

In the embodiment shown, the core 41 is in the form of a hollow cylinder having a length of 50 mm and an inner diameter of 8 mm and an outer diameter of 12 mm. The hollow of the cylindrical core 41 accommodates a heat pipe which is thermally coupled to a metal disc (not shown) incorporated in the support. The coil 40 is situated outside the discharge space 31, in an indentation 35 of the discharge vessel 30. The coil may alternatively be arranged in the discharge space. In operation, the coil is used to induce a high-frequency electromagnetic field in the discharge space 31 which maintains a discharge.

The winding 42 of the coil 40 comprises 20 turns 43. The coil also has a further winding 44 which also comprises 20 turns. The further winding 44 has the same direction of winding as the winding 42 and engages the winding 42 over its entire length. The winding 42 is connected at its ends to, respectively, a first and a second output terminal 54, 55 of a power-supply device 50 via a first and a second power-supply conductor 51, 52 which form, over a part of their length, respectively, a core and a cladding of a coaxial cable 53. During nominal operation, the first output terminal 54 of the supply source 50 provides a supply voltage having a frequency of approximately 3 MHz. The second output terminal 55 is free of high-frequency voltage variations. Such a power-supply device is known from U.S. Pat. No. 4,748,383. The power-supply device 50 is connected to poles P and N of the mains.

The further winding 44 is also connected at one end to the second power-supply conductor 52. The end is located opposite the end of the winding 42 which is connected to the power-supply conductor 52. The other end of the further winding 44 is free.

In the above-described induction lamp the losses caused by heating of the core are substantially reduced. The reduction is ascribed to the use of a sintered core of Li(Ni)Zn ferrite material, the grains of the sintered material being monodomain.

The present invention demonstrates that sintered moulding of Li(Ni)Zn-ferrite material shows a surprising low loss factor V and relatively low total losses P if the majority of the grains of the sintered material have a monodomain structure. This effect is obtained if average grain sizes of 4.2 micrometer or less are used. Sintered moulding of this type can be advantageously applied as transformer core or inductor core.

We claim:

1. A sintered moulding made from Li(Ni)Zn ferrite material wherein at least 98% of the grains of the sintered material have a monodomain structure and the average grain size of the material lies in the range of 1.6–2.6 microns.

2. The sintered moulding as claimed in claim 1, wherein the ferrite material comprises 59–65 mol % $Fe_2O_3$, 7–11 mol % $Li_2CO_3$, 4–8 mol % MnO and 20–28 mol % ZnO.

3. A transformer core comprising a sintered moulding as claimed in claim 1.

4. A transformer having a transformer core as claimed in claim 3, said transformer including, a primary and secondary winding and a high-frequency switch for converting a DC voltage on the primary winding to an AC voltage.

5. An inductor core comprising a sintered moulding as claimed in claim 1.

6. An induction lamp comprising a power-supply device, a discharge vessel, which encloses a discharge space filled with an ionizable gas, as well as a sintered inductor core having a winding which is connected to the power-supply device, wherein an inductor core of sintered Li(Ni)Zn ferrite material, as claimed in claim 5, is used.

* * * * *